United States Patent
Umeda

(10) Patent No.: US 8,175,341 B2
(45) Date of Patent: May 8, 2012

(54) IMAGE PROCESSING METHOD AND APPARATUS THEREOF

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1162 days.

(21) Appl. No.: 11/556,300

(22) Filed: Nov. 3, 2006

(65) Prior Publication Data

US 2007/0140589 A1 Jun. 21, 2007

(30) Foreign Application Priority Data

Nov. 7, 2005 (JP) .................. 2005-322646

(51) Int. Cl.
*G06K 9/00* (2006.01)
*G06K 9/40* (2006.01)
*G03F 3/08* (2006.01)
*H04N 1/46* (2006.01)

(52) U.S. Cl. ........ 382/117; 382/162; 382/163; 382/167; 382/275; 358/518; 358/528

(58) Field of Classification Search .................. None
See application file for complete search history.

(56) References Cited

U.S. PATENT DOCUMENTS

| 5,130,789 | A | * | 7/1992 | Dobbs et al. ................. 358/500 |
| 5,990,973 | A | * | 11/1999 | Sakamoto ..................... 348/576 |
| 7,415,165 | B2 | * | 8/2008 | Itagaki et al. ................. 382/282 |
| 2006/0280363 | A1 | | 12/2006 | Umeda | |

FOREIGN PATENT DOCUMENTS

| JP | 6-350914 | 12/1994 |
| JP | 10-075374 | 3/1998 |
| JP | 2003-304555 | 10/2003 |
| JP | 2004-242141 | 8/2004 |

* cited by examiner

*Primary Examiner* — Samir Ahmed
*Assistant Examiner* — Fred Hu
(74) *Attorney, Agent, or Firm* — Fitzpatrick, Cella, Harper & Scinto

(57) ABSTRACT

In case of an image region having a property of abrupt changes in luminance and tint, even when a region made up of pixels having luminance values and tint levels similar to those of one point designated by the user is extracted as a correction region with reference to the user designated point, it is difficult to extract a region to be corrected without omission. To solve this problem, a user instruction indicating a point inside or near an image region which is to undergo correction is input, and a plurality of origin pixels corresponding to start points of region expansion are set in a region which includes the input point and has a predetermined size. The region expansion is executed from each origin pixel, and a correction region is decided according to the result of the region expansion.

12 Claims, 26 Drawing Sheets

F I G. 1
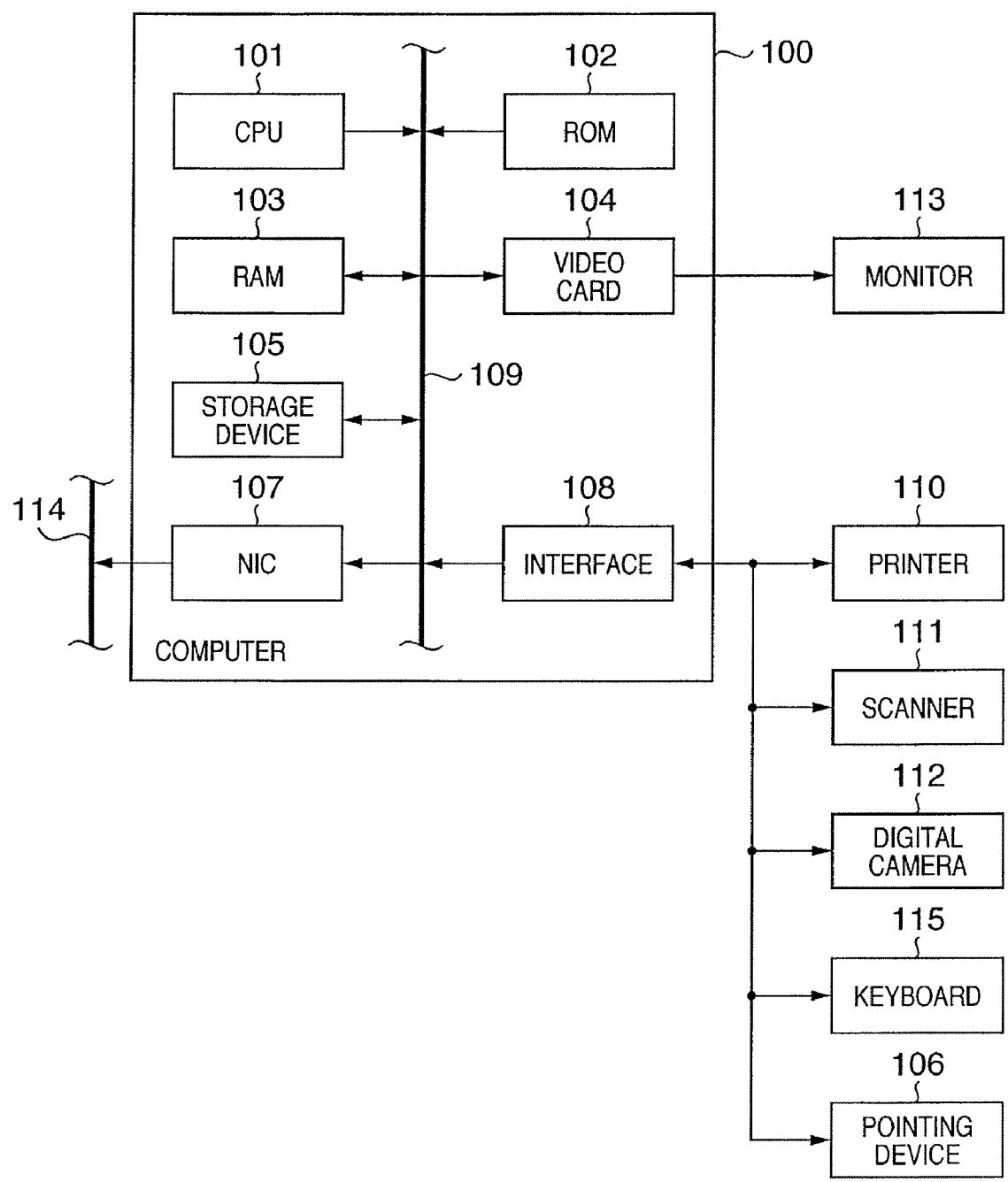

F I G. 3
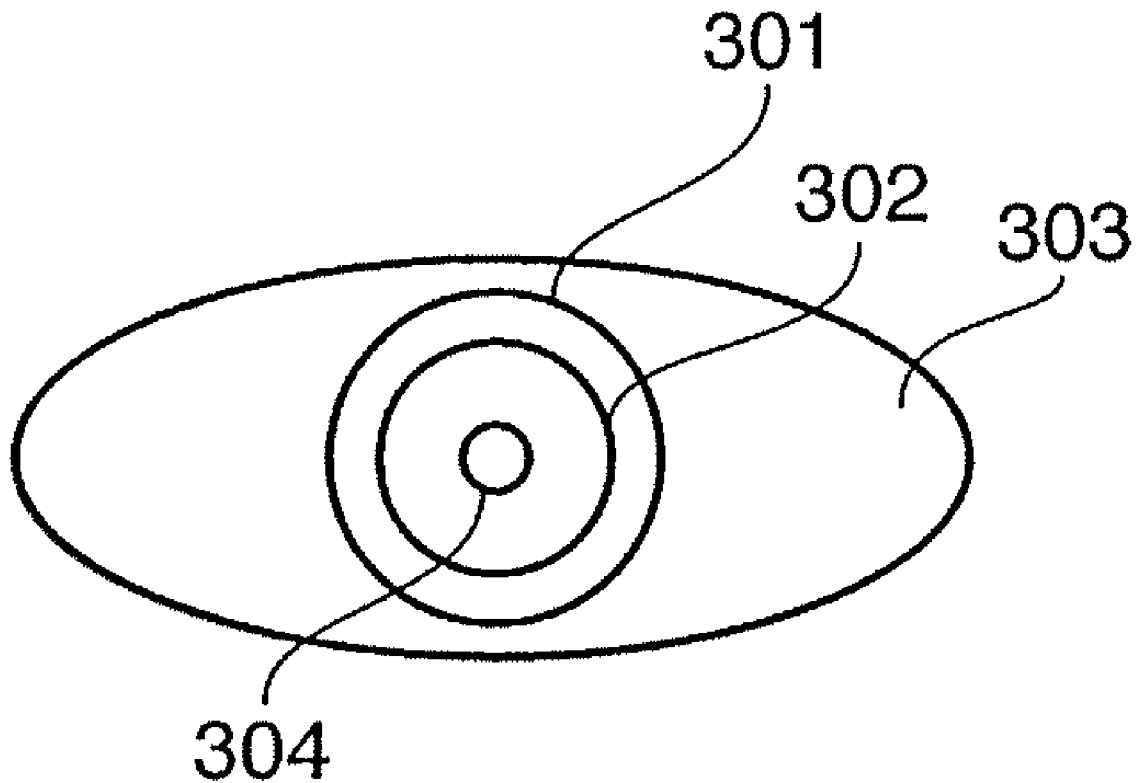

REFERENCE PIXEL

F I G. 16
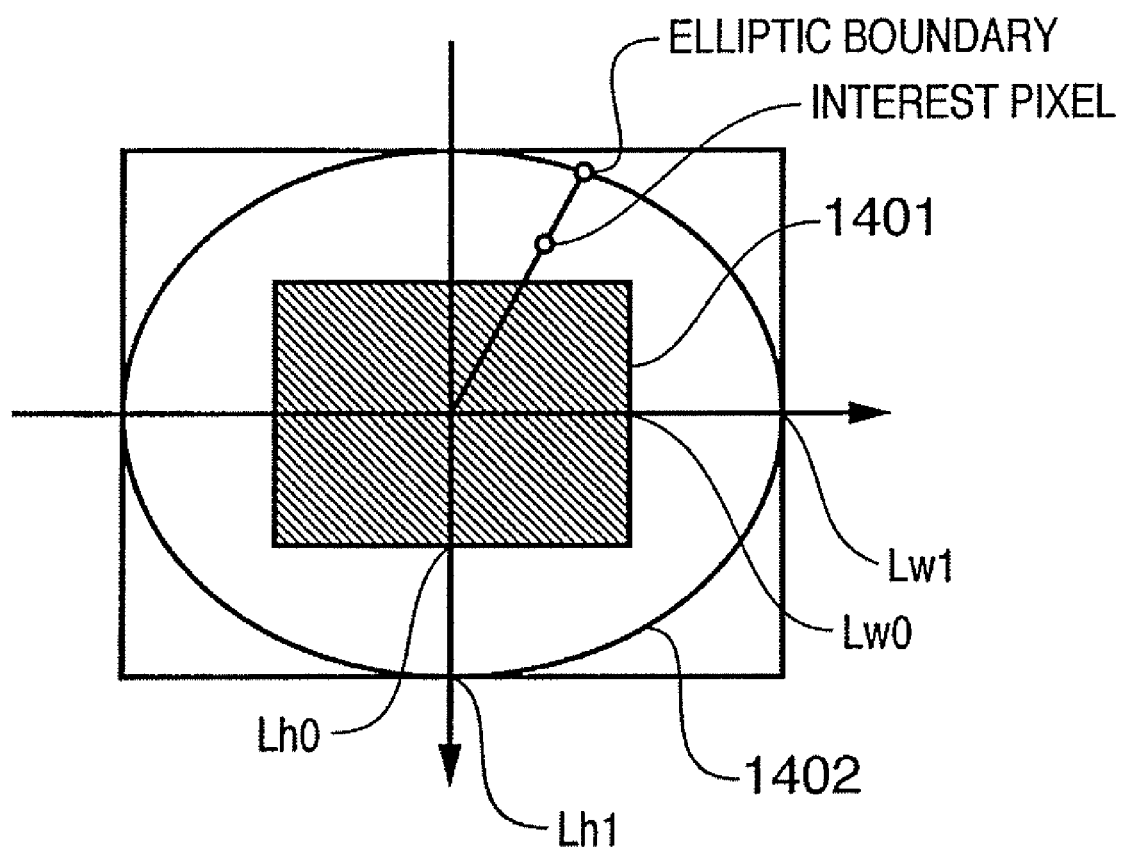

IMAGE PROCESSING METHOD AND APPARATUS THEREOF

BACKGROUND OF THE INVENTION

1. Field of the Invention

The present invention relates to image processing for detecting an image region that exhibits some poor color tone of an eye image.

2. Description of the Related Art

A method of correcting the poor color tone of an eye image due to a photographic flash of a camera has been proposed. Note that the poor color tone of an eye image is generally well known as a red-eye effect. The red-eye effect is as follows. That is, upon photographing a person or an animal such as a dog, cat, or the like using a photographic flash under an insufficient illumination environment, the flash light that has entered the opening pupil part is reflected by the eyeground, and the capillaries gleam red. Since a person who has a pale pigment color (or a light pigment) has a higher transmittance of the pupil, i.e., crystal lens, the red-eye effect tends to occur more frequently with such person.

In recent years, digital cameras are increasingly downsized, and the optical axis of a lens tends to be near the light source position of a photographic flash. In general, as the light source position of the photographic flash is closer to the optical axis of the lens, the red-eye effect occurs more readily, and a measure against this phenomenon is a critical issue.

As one means for preventing the red-eye effect, a method of performing pre-light emission before photographing, and taking a picture after the pupil of the object is closed is known. However, this method consumes a battery more than normal photographing, and changes the expression of the object due to pre-light emission.

Many methods of compensating for a red-eye image by correcting and modifying digital image data photographed by a digital camera using a personal computer have been proposed.

The methods of correcting the red-eye effect on digital image data are roughly classified into manual correction, semiautomatic correction, and automatic correction.

With the manual correction method, the user designates and corrects a red-eye region displayed on a display using a pointing device such as a mouse, stylus, tablet, or the like, or a touch panel.

With the semiautomatic correction method, the user roughly designates a region where a red-eye image exists, and correction is applied by specifying a correction range of the red-eye image based on that information. For example, the user designates a region that surrounds the two eyes using a pointing device, or designates one point near the eye. Based on information of this designated region or designated point, the correction range is specified to apply correction.

With the automatic correction method, a correction region is automatically detected from digital image data and correction processing is executed without any specific operation by the user.

Upon examining these correction methods, the automatic correction method which does not require any troublesome operations for the user and can be executed using even a device which does not comprise any high-performance display with high visibility seems most useful. However, it is not guaranteed for the automatic correction method to detect a red-eye region from an image without fault, and a red region other than a red-eye image may be erroneously detected and corrected. For this reason, image edit software or the like mounts a function of correcting a red-eye image by combining automatic correction and manual or semi semiautomatic correction. The user applies automatic correction to an image from which a red-eye image is to be corrected, and performs manual correction if he or she is dissatisfied with that result. In other words, the manual correction is an important function that compensates for the automatic correction precision.

The following techniques have been disclosed about the manual correction and semiautomatic correction methods.

A technique disclosed by U.S. Pat. No. 5,130,789 makes the user designate a region including a red-eye image to be corrected, and also designate one point in the red-eye image. The technique sets the color of a pixel of this point as a target color, and generates a geometric shape to have the target color as the center. The technique then checks for each pixel in the region designated by the user if the shape includes the color of an interest pixel, and determines pixels whose colors are included in the shape as those which form the red-eye image (to be referred to as "red-eye pixels" hereinafter), thus correcting these pixels.

Also, a technique disclosed by Japanese Patent Application Laid-Open No. 6-350914 makes the user designate an outline of a correction region or one point near the correction region using a light pen or the like. If the values of color components (e.g., RGB components) of an interest pixel included in the correction region fall within a predetermined range, the technique determines that the interest pixel is a candidate pixel which forms the red-eye image, and then checks if a set (region) of candidate pixels is a red-eye image. Then, the technique corrects the set (region) of candidate pixels determined as the red-eye image to black.

When the user designates a region including an eye, a technique disclosed by Japanese Patent Application Laid-Open No. 10-75374 checks based on the hue and saturation values of the designated region if a red-eye image exists in that region. If it is determined that a red-eye image in fact exists, the technique corrects that region. Furthermore, the technique detects catch light of an eye region, i.e., a light spot where flash light is reflected, and emphasizes the catch light if it is determined that the catch light is weak.

A technique disclosed by Japanese Patent Application Laid-Open No. 2003-304555 makes the user designate an image region including an eye, and also at least one point in the red-eye image. The technique compares the red levels of neighboring pixels in the region designated by the user, and extracts one or a plurality of red boundaries. The technique checks if the designated point falls within the red boundary. If the designated point does not fall within the red boundary, the technique does not determine the interior of the boundary as a red-eye image. That is, this method allows manual correction with high certainty.

According to the research conducted by the present applicant, although a red-eye image is a local region, it has a broad luminance distribution from a low luminance level to a high luminance level, and its tint also ranges from high-saturation red to low-saturation red. That is, the red-eye image has the property of abrupt changes in luminance and tint although it appears locally. The aforementioned technique determines based on the pixel of one point designated by the user a criterion to determine whether or not the interest pixel is a red-eye pixel. In other words, the above technique extracts pixels having a luminance and tint similar to those of one point designated by the user as red-eye pixels using that point as a criterion. However, it is difficult to extract the pixels of the red-eye image having the above property using one point as a criterion.

The above technique uses the distance between the tint of an interest pixel and a target color. However, based on such simple criterion, it is difficult to reliably extract the pixels of the red-eye image with the above property.

Furthermore, the above technique uses hue and saturation to determine whether or not the interest pixel is a red-eye pixel. However, this method suffers the following problems.

As is well known, when a pixel value is given by an RGB system, a saturation value S is given by:

$$S = \{\max(R,G,B) - \min(R,G,B)\}/\max(R,G,B) \quad (1)$$

where max(R, G, B) is the maximum value of RGB components, and min(R, G, B) is the minimum value of RGB components.

For example, as is apparent from the experimental results, the flesh color regions of Japanese people are normally distributed around 0 to 30° in the hue domain (0 to 359°). Note that a hue angle of an HSI system near 0° is red, and it becomes more yellowish with increasing hue angle. The magnitude relationship of RGB values around 0 to 30° satisfies:

$$R > G > B \quad (2)$$

As described above, in case of a person who has a dark pigment color (or a rich pigment), a bright red-eye image hardly tends to form compared to a person who has a pale pigment color (or a light pigment).

In consideration of these facts, the red-eye pixel values and the pixel values of the flesh color region around the eyes of the Japanese can be estimated as:

Red-eye region: (R, G, B)=(109, 58, 65)

Flesh color region: (R, G, B) (226, 183, 128)

In the above case, the saturation value of red-eye pixels is 40, and that of pixels of the flesh color region is 43, i.e., these saturation values are roughly equal to each other. In other words, if pixels which have saturation values within a given range having the saturation value of the target color as the center are determined as red-eye pixels, the pixels of the flesh color region are also more likely to be determined as red-eye pixels.

SUMMARY OF THE INVENTION

The first aspect of the present invention discloses a method of detecting a correction region of an image, comprising the steps of: inputting a user instruction indicating a point inside or near a region of an image which is to undergo correction; setting a plurality of origin pixels corresponding to start points of region expansion in a region which includes the input point and has a predetermined size; executing the region expansion from each of the origin pixels; and deciding the correction region according to a result of the region expansion.

According to the present invention, an image region to be corrected can be easily designated, and a correction region can be detected with high precision. Also, a correction region of an image can be easily and accurately detected.

Further features of the present invention will become apparent from the following description of exemplary embodiments with reference to the attached drawings.

BRIEF DESCRIPTION OF THE DRAWINGS

FIG. 1 is a block diagram showing the arrangement of a computer (image processing apparatus) which executes image processing according to an embodiment of the present invention;

FIG. 3 conceptually shows a red-eye image captured by an image sensing device such as a digital camera or the like;

FIG. 16 is a view for explaining processing for setting a correction range;

DESCRIPTION OF THE EMBODIMENTS

Figure 2:
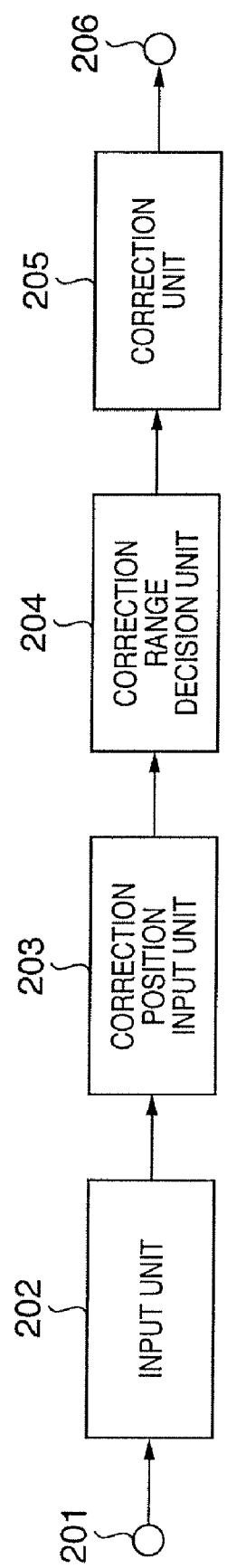
FIG. 2 is a functional block diagram showing an overview of correction processing of a red-eye image according to the first embodiment.

Image processing according to preferred embodiments of the present invention will be described in detail hereinafter with reference to the accompanying drawings. Note that the image processing to be described hereinafter is desirably incorporated in a printer driver which generates image information to be output to a printer engine, and runs in a computer. Alternatively, the image processing to be described hereinafter is desirably incorporated in a scanner driver which drives an optical scanning device such as a scanner or the like, and runs in a computer. Alternatively, the image processing to be described hereinafter may be built in hardware such as a copying machine, facsimile, printer, scanner, digital camera, digital video camera, or the like, or it may be supplied as software.

Embodiments for extracting a correction region will be described hereinafter taking as an example a case wherein the poor color tone of an image due to a red-eye effect is to be corrected. However, the present invention can extract a correction region other than a red-eye region by adjusting the calculation method of a color evaluation amount (to be described later) to an image region to be extracted.

First Embodiment

Arrangement of Apparatus

FIG. 1 is a block diagram showing the arrangement of a computer (image processing apparatus) which executes image processing according to an embodiment of the present invention.

A computer 100 comprises a CPU 101. The CPU 101 is connected to a ROM 102 and RAM 103 via a system bus 109. Furthermore, the system bus 109 connects a video card 104 that connects a monitor 113, a storage device 105, an interface 108, and a network interface card (NIC) 107 to each other.

The monitor 113 may comprise a touch panel. The storage device 105 comprises a hard disk driver, memory card, or the like. A pointing device 106 includes a mouse, stylus, tablet, or the like. The interface 108 is a serial bus interface such as USB (Universal Serial Bus), IEEE1394, or the like. To the interface 108, the pointing device 106, a keyboard 115, a printer 110, a scanner 111, a digital camera 112, and the like can be connected. The NIC 107 establishes connection to a network 114.

The CPU 101 loads programs (including a program of image processing to be described below) stored in the ROM 102 or storage device 105 onto the RAM 103 as a work memory, and executes the programs. By controlling the above components via the system bus 109 in accordance with the programs, the CPU 101 implements the functions of the programs.

Note that FIG. 1 shows the general arrangement of hardware that implements image processing to be described in the first embodiment, and the arrangement from which some components are omitted or to which other devices are added is included in the scope of the present invention.

[Overview of Processing]

FIG. 2 is a functional block diagram showing an overview of correction processing of a red-eye image according to the first embodiment. The CPU 101 executes this processing. Note that an input image is digital image data which is input from, e.g., the digital camera 112 or film scanner 111 and is expressed by 8-bit RGB data, i.e., a total of 24 bits per pixel.

FIG. 3 conceptually shows a red-eye image captured by an image sensing device such as the digital camera 112 or the like, and illustrates a pupil region 302 and iris region 301 of an eye, and a highlight region 304 that forms due to photographic flash light used in photographing. Reference numeral 303 denotes a white portion. Normally, the pupil region 302 becomes red due to a red-eye effect.

An input unit 202 shown in FIG. 2 receives image data from an input terminal 201, and displays it on the monitor 113 so that the user can visually confirm the input image. The user designates one point inside or near a region, where he or she wants to correct a red-eye image using the pointing device 106, with reference to the image displayed on the monitor 113. A correction position input unit 203 inputs this user instruction.

Figure 4:
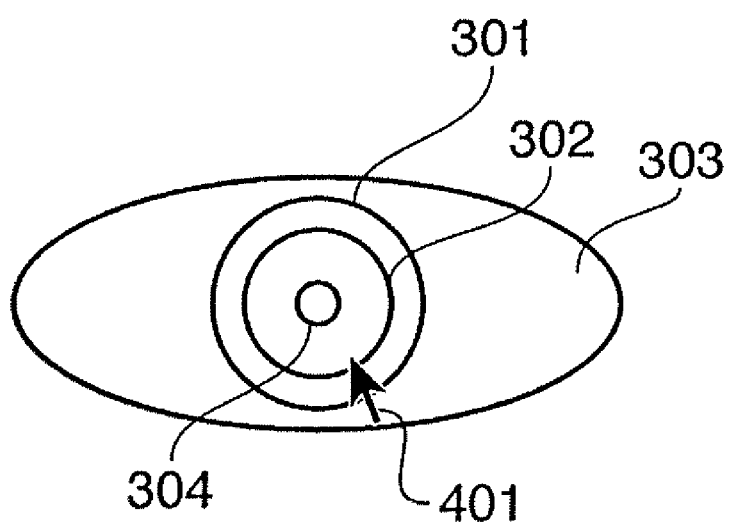
FIG. 4 is a view showing a state in which the user designates one point inside or near a region where he or she wants to correct a red-eye image.

FIG. 4 shows a state in which the user designates one point inside or near a region where he or she wants to correct a red-eye image. The user moves a mouse pointer 401 into the pupil region 302 of the red-eye image and clicks a mouse button. The correction position input unit 203 inputs position information on the image pointed by the mouse pointer at the time of clicking.

A correction range decision unit 204 specifies the pupil region 302 of the red-eye image based on the position information input by the correction position input unit 203, and decides a correction range. The correction range is decided by applying a region expansion method to the input position information and grouping pixels having similar features, as will be described in detail later.

A correction unit 205 receives the correction range from the correction range decision unit 204, applies correction processing to that correction range, and outputs the image data which has undergone the correction processing to an output terminal 206. The image data after the correction processing is displayed on the monitor 113 or is stored in the RAM 103 or storage device 105. Alternatively, the image data is printed by the printer 110 connected to the interface 108 or is transmitted to another computer or server connected to the network 114 (including an intranet and the Internet) via the NIC 107.

[Correction Range Decision Unit]

Figure 5:
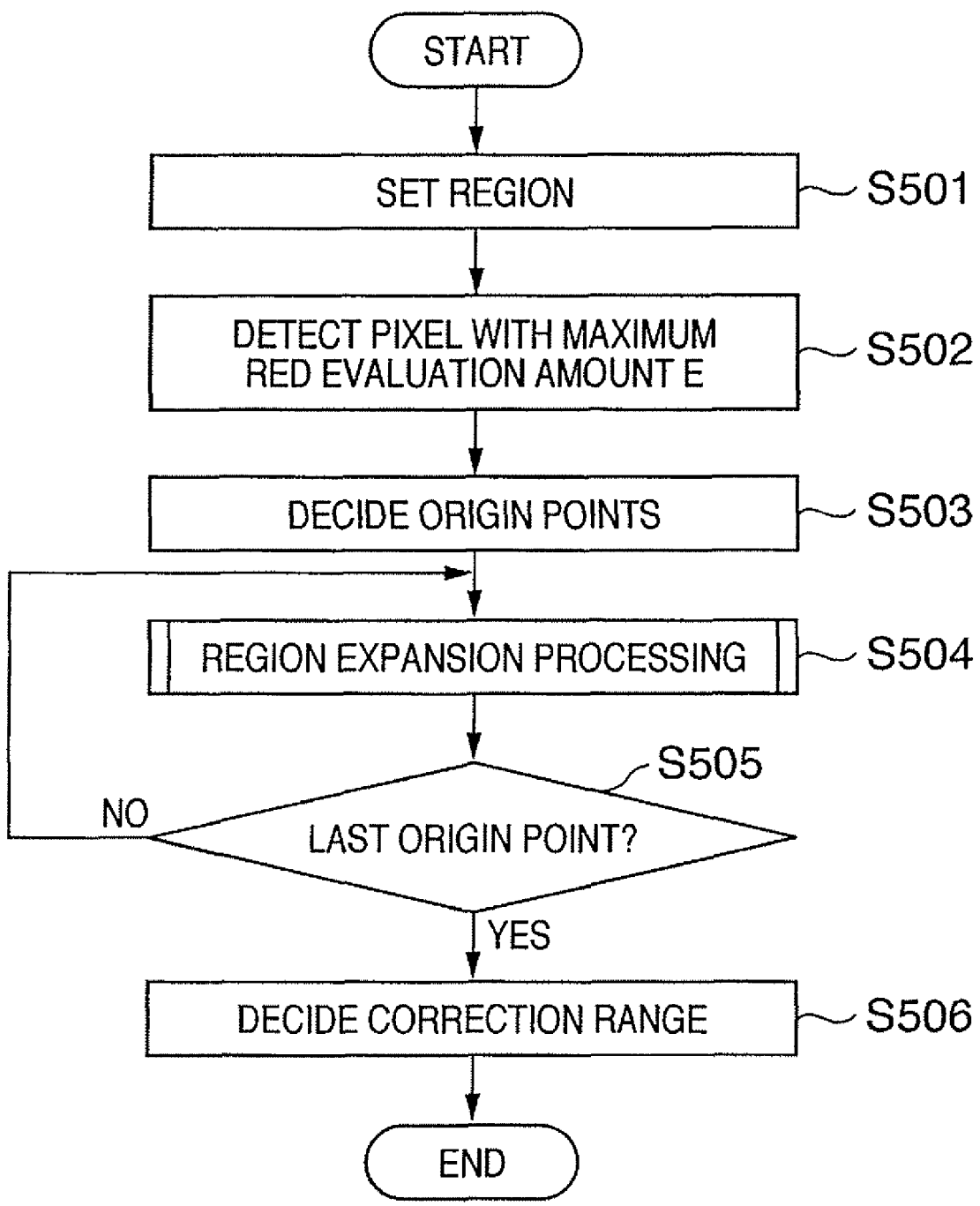
FIG. 5 is a flowchart for explaining the processing of a correction range decision unit.

FIG. 5 is a flowchart for explaining the processing of the correction range decision unit 204.

Figure 6:
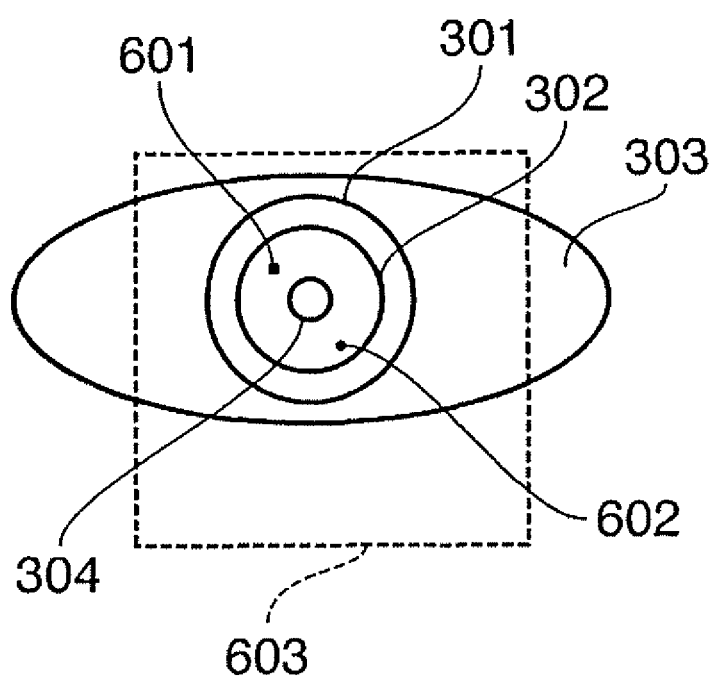
FIG. 6 shows an example of a region to be set in step S501.

The CPU 101 sets a region based on the position information input by the correction position input unit 203 (S501). FIG. 6 shows an example of the region to be set in step S501. The CPU 101 sets a rectangular region 603 which has, as the center, a point 602 as the input position information designated by the user, and a predetermined size. The rectangular region 603 can have an arbitrary size. For example, one side of the rectangular region 603 is desirably set to be about several percentages (2 to 5%) of the short side of an image represented by the input image data.

Next, the CPU 101 detects a pixel having a maximum color evaluation amount in the rectangular region 603 (S502). Note that the color evaluation amount indicates the intensity of red calculated per pixel. The color evaluation amount can adopt various indices. For example, the saturation of an HSI system, a Cr component after an RGB system is converted into YCbCr as luminance and color difference components, and the like may be used. Note that the first embodiment uses, as a special evaluation amount, a red evaluation amount E given by:

$$E(R-G)/R \qquad (3)$$

Equation (3) means that the degree of redness of an interest pixel is calculated from two, R and G components except for a B component in place of the saturation level of a general HSI system. Advantages obtained upon defining the red evaluation amount E by equation (3) in place of saturation will be described below.

For example, in case of a person who has a dark pigment color (or a rich pigment), since the transmittance of the crystal lens of the pupil region 302 is low, a bright red-eye image hardly tends to form. As described above, experiments reveal that the estimated value of the pixel value of the red-eye region of the Japanese is (R, G, B) (109, 58, 65), and the hue values of the flesh color of many Japanese people are distributed within the range from red (0°) to yellow (600). In such region, R, G, and B components meet R>G>B, and the estimated value of the pixel value of the flesh color region around an eye is (R, G, B)=(226, 183, 128). That is, the pixels in both the red-eye region and the flesh color region around the eye have small B components. In such case, the saturation value of the red-eye pixel is 40, and that of the pixel of the flesh color region around the eye is 43, i.e., these saturation values are roughly equal to each other. In other words, the saturation value of the pixel of the red-eye region especially does not stand out with respect to that of the pixel of the flesh color region around the eye. Therefore, if the saturation value is used, it is difficult to specify the correction range.

On the other hand, if the red evaluation amount E is defined by equation (3), i.e., as an evaluation amount which does not depend on the B component, the red evaluation amount E of the pixel of the red-eye region is 47, and that of the flesh color region around the eye is 19. That is, the red evaluation amount E of the pixel of the red-eye region assumes a value twice or more that of the flesh color region around the eye.

For this reason, upon detecting a red-eye image of a person who has a dark pigment color (or a rich pigment), since an evaluation amount is defined by only R and G components without any B component, as given by equation (3), in place of the saturation, red-eye pixels can be extracted with high precision. In equation (3), the ratio of (R−G) to an R component defines the red evaluation amount E. However, the present invention is not limited to this. For example, (R−G) alone or R/G may be used as the red evaluation amount E.

Note that upon detecting a red-eye image of a person who has a pale pigment color (or a light pigment), since an evaluation amount is defined by only R and G components without any B component, as given by equation (3), in place of the saturation, red-eye pixels can be extracted with high precision, needless to say.

In FIG. 6, a pixel 601 has a maximum red evaluation amount E in the rectangular region 603.

Next, the CPU 101 decides an origin position used in region expansion (S504) as the processing of the next stage (S503). The CPU 101 executes region expansion to have this origin position as a start point. For example, it is an easiest way to set the user designated point 602 as the origin position. Note that the first embodiment will explain a method of region expansion from a plurality of origins.

Figure 7:
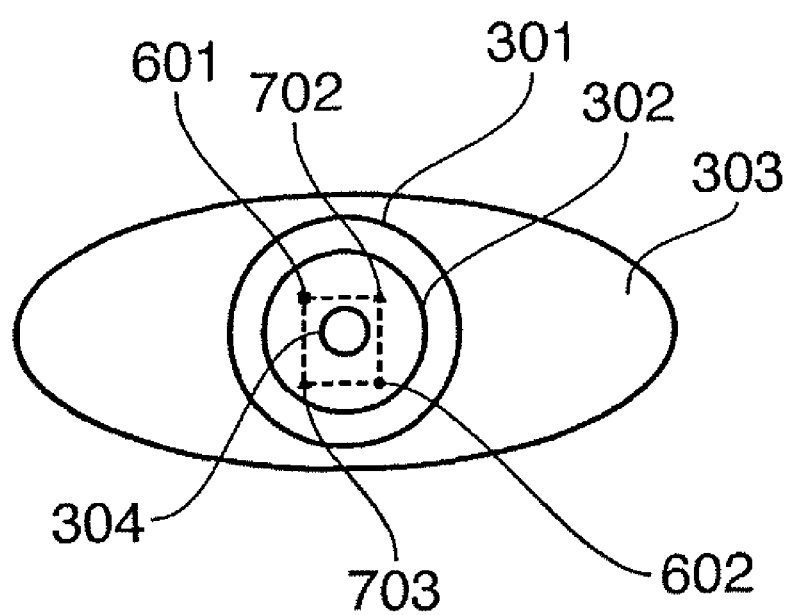
FIG. 7 shows an example of an origin position to be decided in step S503.

FIG. 7 shows an example of origin positions to be decided in step S503.

The first embodiment sets a rectangle which has the user designated point 602 and the pixel 601 with the maximum color evaluation amount E as diagonal vertices, and decides the four vertices of the rectangle, i.e., the points 601 and 602 and points 702 and 703 as origins. That is, the region expansion (S504) executes expansion processing to have the four points shown in FIG. 7 as start points.

Figure 8:
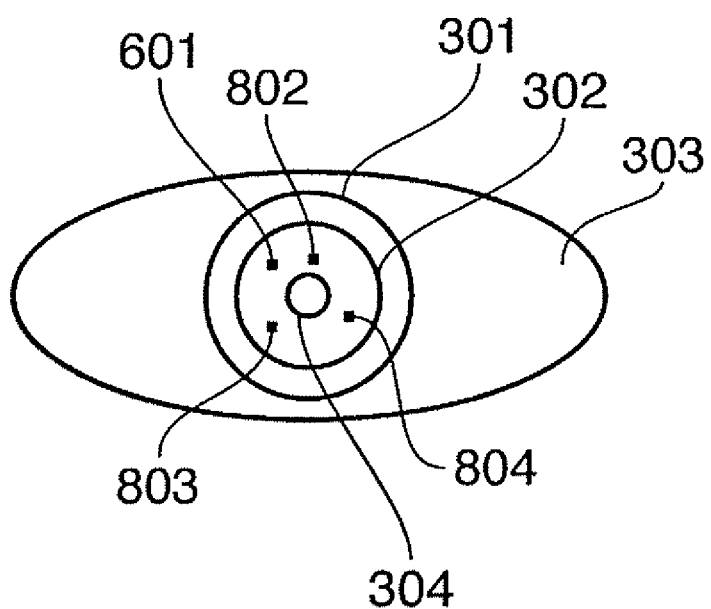
FIG. 8 shows an example in which top four points of color evaluation amounts E are set as origins.

Of course, the origins are not limited to the above four points. Of the four points shown in FIG. 7, two points 702 and 703 may be used or three points excluding one arbitrary point may be used. Alternatively, the red evaluation amounts E of pixels in the rectangular region 603 are calculated, and top several points of the color evaluation amounts E may be used as origins. FIG. 8 shows an example in which top four points of the red evaluation amounts E (points 802 to 804 including the point 601) as origins. Furthermore, five points obtained by adding the user designated point 602 to the top four points may be used as origins.

Region Expansion (S504)

Figure 9:
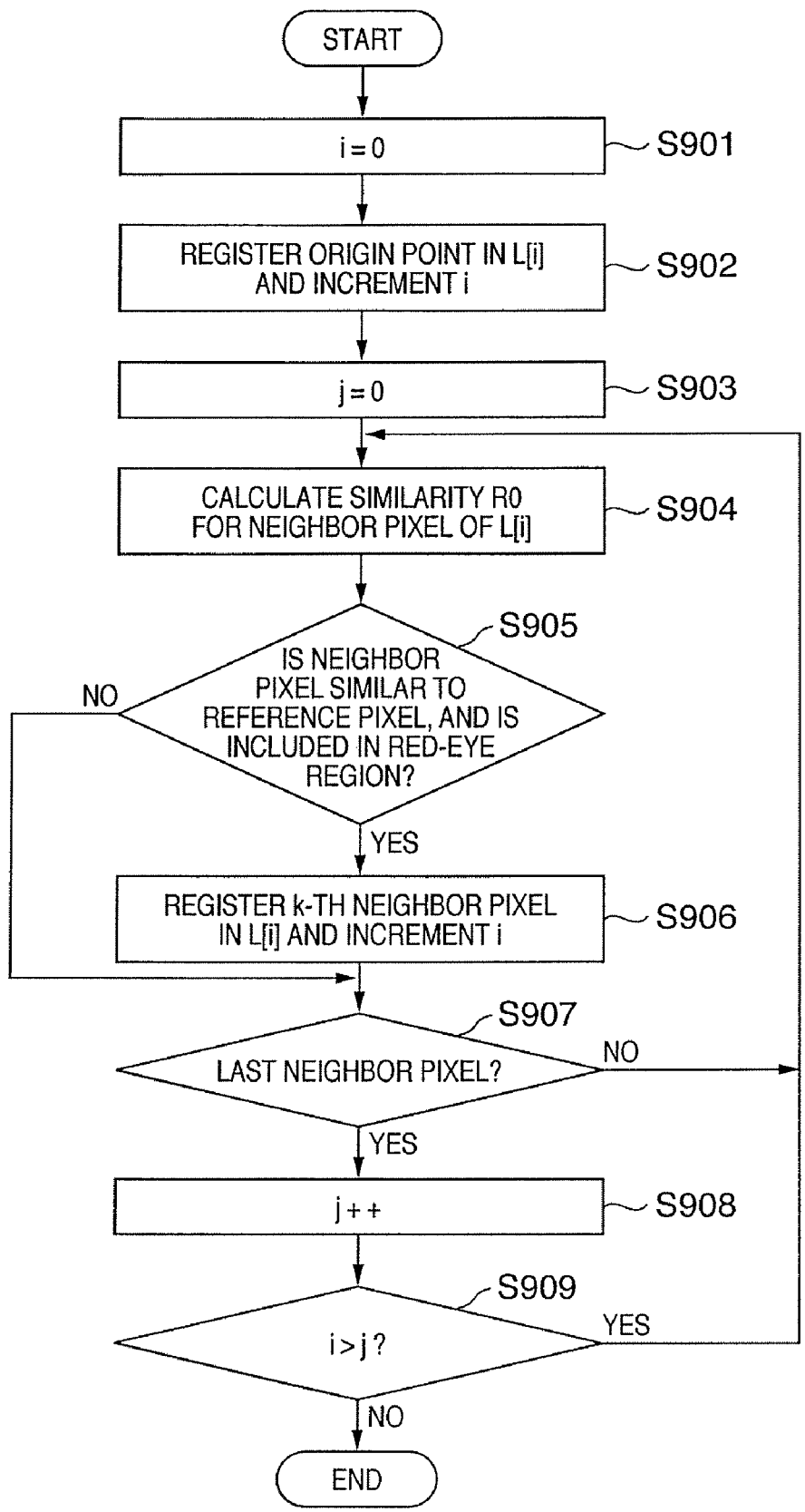
FIG. 9 is a flowchart for explaining region expansion.

FIG. 9 is a flowchart for explaining region expansion.

The CPU 101 resets a parameter i to zero (S901), and registers the coordinate position (pixel) of one origin at the i-th position (L[i]) of a list L (S902). Note that the list L is an array which can store a plurality of coordinate positions.

The CPU 101 resets a parameter j to zero (S903), and calculates similarities of pixels (to be referred to as "neighbor pixels" hereinafter) which neighbor a pixel registered in L[j] (to be referred to as a "reference pixel" hereinafter) (S904). The CPU 101 checks if the neighbor pixels are similar to the reference pixel, and are included in a red-eye region (S905).

Figure 10:
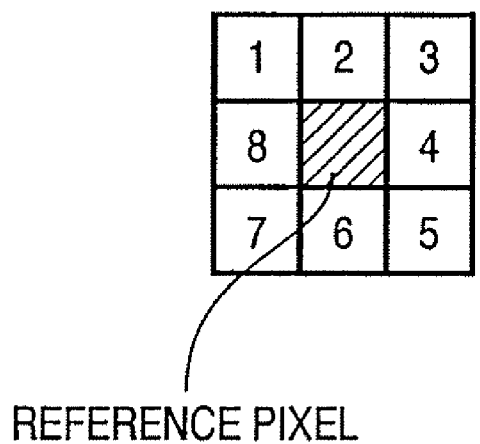
FIG. 10 shows an example of neighbor pixels.

FIG. 10 shows an example of the neighbor pixels. Eight pixels which neighbor a central reference pixel are set as neighbor pixels. Note that numerals given to boxes of the neighbor pixels are indices k of the neighbor pixels.

As the similarity, the CPU 101 calculates a difference R0 between a red evaluation amount Ej of the reference pixel and a red evaluation amount Ek of the k-th (k=0 to 8) neighbor pixel:

$$R0 = |Ek - Ej| \quad (4)$$

If the similarity R0 is smaller than a predetermined threshold T0, i.e., if Ek and Ej are close to each other, the CPU 101 determines that the k-th neighbor pixel is similar to the reference pixel.

$$\text{If } R0 < T0, \text{ similarity is high} \quad (5)$$

Note that the similarity R0 may be defined using, e.g., a ratio between Ek and Ej in place of their difference.

The technique described as the prior art calculates color evaluation amounts (e.g., hue values, saturation values, color difference components, or RGB values themselves) between the neighbor pixels and reference pixel, determines their similarities based on the differences, and determines the neighbor pixel having a high similarity as a red-eye pixel. However, if such determination is made, the following problem is posed.

Figure 11:
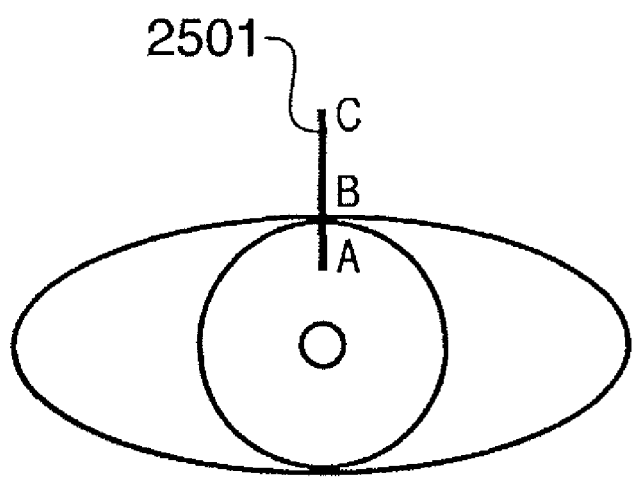
FIGS. 11 and 12 are views for explaining processing for specifying a correction region (red-eye region)
Figure 12:
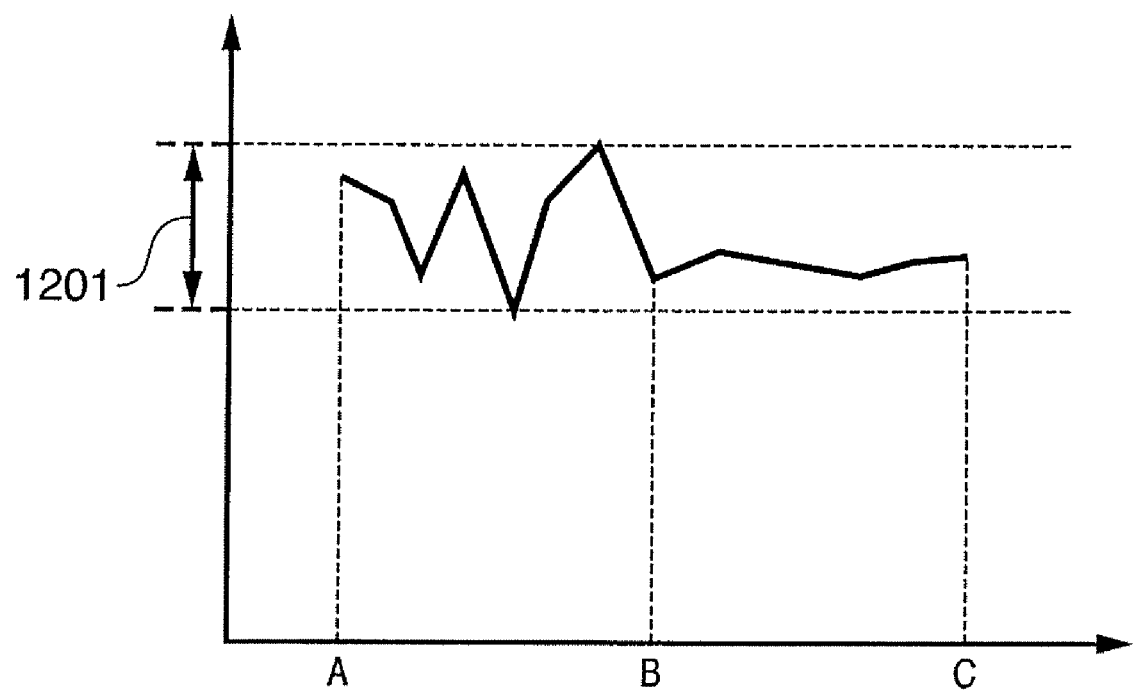

When the color evaluation amounts from pixel A to pixel C are calculated and plotted for pixels which are located in a line segment-like region 2501 shown in FIG. 11, a graph shown in FIG. 12 is obtained. That is, pixels from pixel A to pixel B are located within the pupil region of a red-eye image, and those from pixel B to pixel C are included in a flesh color region outside the red-eye image. According to the research conducted by the present applicant, most of red-eye images have a feature that variations of color evaluation amounts in the red-eye region are larger than those of the flesh color region, as shown in FIG. 12. Therefore, in order to extract red-eye pixels without omission, the range of color evaluation amounts to be detected as red-eye pixels, i.e., the range corresponding to the threshold T0, need be set as a range 1201 shown in FIG. 12. However, if such range is set, pixels ranging from pixel A to pixel C are extracted as red-eye pixels as well as the flesh color region with less variations of color evaluation amounts, and the correction region includes the flesh color region. In order for the flesh color region to be excluded from the correction region, the range 1201 narrows down, and it becomes harder to extract red-eye pixels without omission.

In order to solve this problem, second determination is applied to the neighbor pixels which are determined to be similar to the reference pixel. The second determination will be described below in correspondence with the example in FIG. 10. In the second determination, the CPU 101 calculates a difference Vj between the red evaluation amounts E of the reference pixel and the neighbor pixel (k=2) immediately above the reference pixel. Then, the CPU 101 calculates a difference Vk between the red evaluation amounts E of the neighbor pixel of k=2 and a surrounding pixel which further neighbors that neighbor pixel. Then, the CPU 101 sets the difference between these differences as a determination value R1 (see equations (6)). In this example, the CPU 101 calculates the determination value R1 between the neighbor pixel which is located immediately above the reference pixel and its upper neighboring surrounding pixel. Likewise, in case of a neighbor pixel which is located immediately below the reference pixel, the CPU 101 calculates a determination value R1 between the neighbor pixel and its lower neighboring surrounding pixel. That is, the CPU 101 calculates a determination value R1 from the red evaluation amounts E of three pixels which are contiguous in the upper direction, lower direction, left direction, right direction, upper left direction, upper right direction, lower right direction, or lower left direction to have the reference pixel as the center.

$$Vj = |Ek - Ej|$$

$$Vk = |En - Ek|$$

$$R1 = |Vj - Vk| \qquad (6)$$

where En is the red evaluation amount of a non-reference pixel which neighbors the k-th neighbor pixel.

If Vj and Vk assume close values in step S905, in other words, if the similarity R1 of variation amounts is smaller than a predetermined threshold T1 (if inequality (7) holds), the CPU 101 determines that the similarity between the variation amounts of the interest pixel and reference pixel is high.

$$R1 < T1 \qquad (7)$$

If such similarity determination of variation amounts is applied to the variations shown in FIG. 12, since the variation characteristics of the red evaluation amount E of pixel B are apparently different from those of the red evaluation amounts E of surrounding pixels, the probability of erroneous extraction of pixels B to C can be reduced.

In this way, the second determination is further applied to the neighbor pixels which are determined by the first determination to be similar to the reference pixel. That is, for the neighbor pixels which have cleared the first determination, whether or not the neighbor pixel of interest falls within the red-eye region is determined based on the differences Vj of the red evaluation amounts from the reference pixel, and the differences Vk of the red evaluation amounts with non-reference pixels which neighbor in any of the left, right, upper, lower, and oblique directions. In this way, the probability of extraction of pixels within the range from pixel B to pixel C as red-eye pixels due to the variations of the red evaluation amounts E shown in FIG. 12 is reduced. That is, in addition to determination as to whether or not the red evaluation amount E is close to a reference value, whether or not an interest pixel is included in the red-eye region is determined in consideration of the degree of change in red evaluation amount E from neighbor pixels, thus specifying the red-eye region with higher precision.

In this way, the CPU 101 registers the neighbor pixels which have cleared the first and second determination processes in the list L (S906), and checks other neighbor pixels in the checking processing in step S907. Note that pixels of the neighbor pixels which have already been registered in the list L need not undergo the above determination processes again.

In the above description, the determination value R1 is defined as the difference between Vk and Vj. For example, the determination value R1 may be defined using the ratio between Vk and Vj. Also, Vk is defined as the difference between the red evaluation amounts E from the non-reference pixel which neighbors the neighbor pixel in any of the right, left, upper, lower, and oblique directions. Alternatively, the difference sum of the color evaluation amounts E of a plurality of neighbor pixels without the reference pixel may be used.

Upon completion of determination of all the neighbor pixels of a given reference pixel, the CPU 101 increments the parameter j (S908) and compares the parameters i and j (S909). If i>j, the process returns to step S904 to repeat determination for the next reference pixel L[j]. If i=j, since the determination for all the pixels registered in the list L is complete, the region expansion processing ends.

Figure 13:
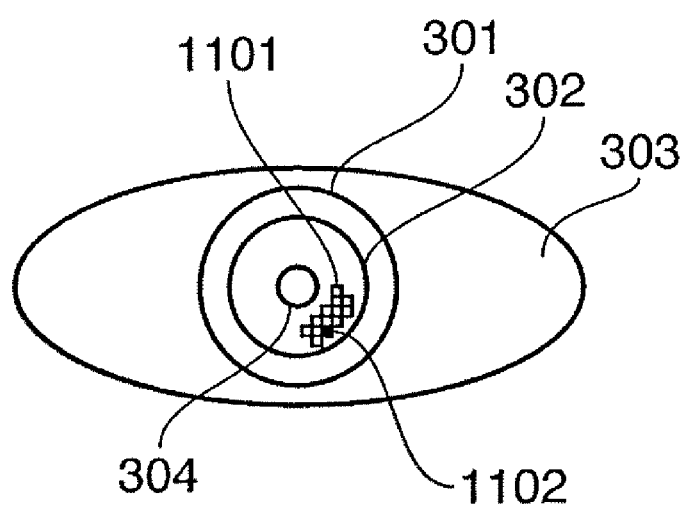
FIG. 13 is a view for explaining pixels which are registered in a list L by region expansion.

FIG. 13 is a view for explaining pixels registered in the list L by the region expansion. As a result of the region expansion with respect to an origin pixel 1102, a pixel group 1101 is registered in the list L. The region expansion process allows to appropriately extract pixels in the pupil region 302 in most of red-eye images. However, in some red-eye images, only partial pixels of the pupil region 302 may be extracted, as shown in FIG. 13. In such case, if only the origin pixel 1102 and pixel group 1101 are used as the correction region, a desired correction result cannot be obtained.

In order to expand the pixel group 1101 to the entire pupil region 302, limitations using thresholds T0 and T1 may be relaxed. However, if the limitations are relaxed, the region may be unwantedly expanded to the flesh color region. Hence, in place of relaxing the limitations, a plurality of origins of the region expansion are set, thus precisely specifying red-eye regions from the pupil region 302. Note that as the decision method of a plurality of origins, the four vertices of a rectangle having the pixel 601 with the maximum color evaluation amount E may be used as origins, as described above. Alternatively, the color evaluation amounts E of pixels within the region set in step S501 may be calculated, and top several points of them may be used as origins.

Figure 14:
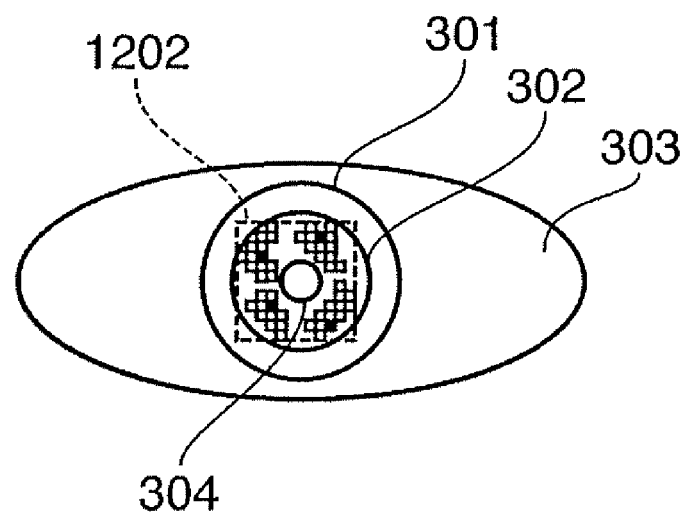
FIG. 14 shows an example in which region expansion is made for a plurality of origins.

FIG. 14 shows an example of region expansion for a plurality of origins. In FIG. 14, pixel groups detected based on region expansion from four origins exist. In step S506 shown in FIG. 5, the CPU 101 decides a region 1202 which includes all pixels detected by the region expansion as the correction region. Note that FIG. 14 illustrates the region 1202 as a rectangular region. Alternatively, a circular region, elliptic region, or polygonal region may be used, or the user may select or input the shape of the region.

[Correction Unit]

Figure 15:
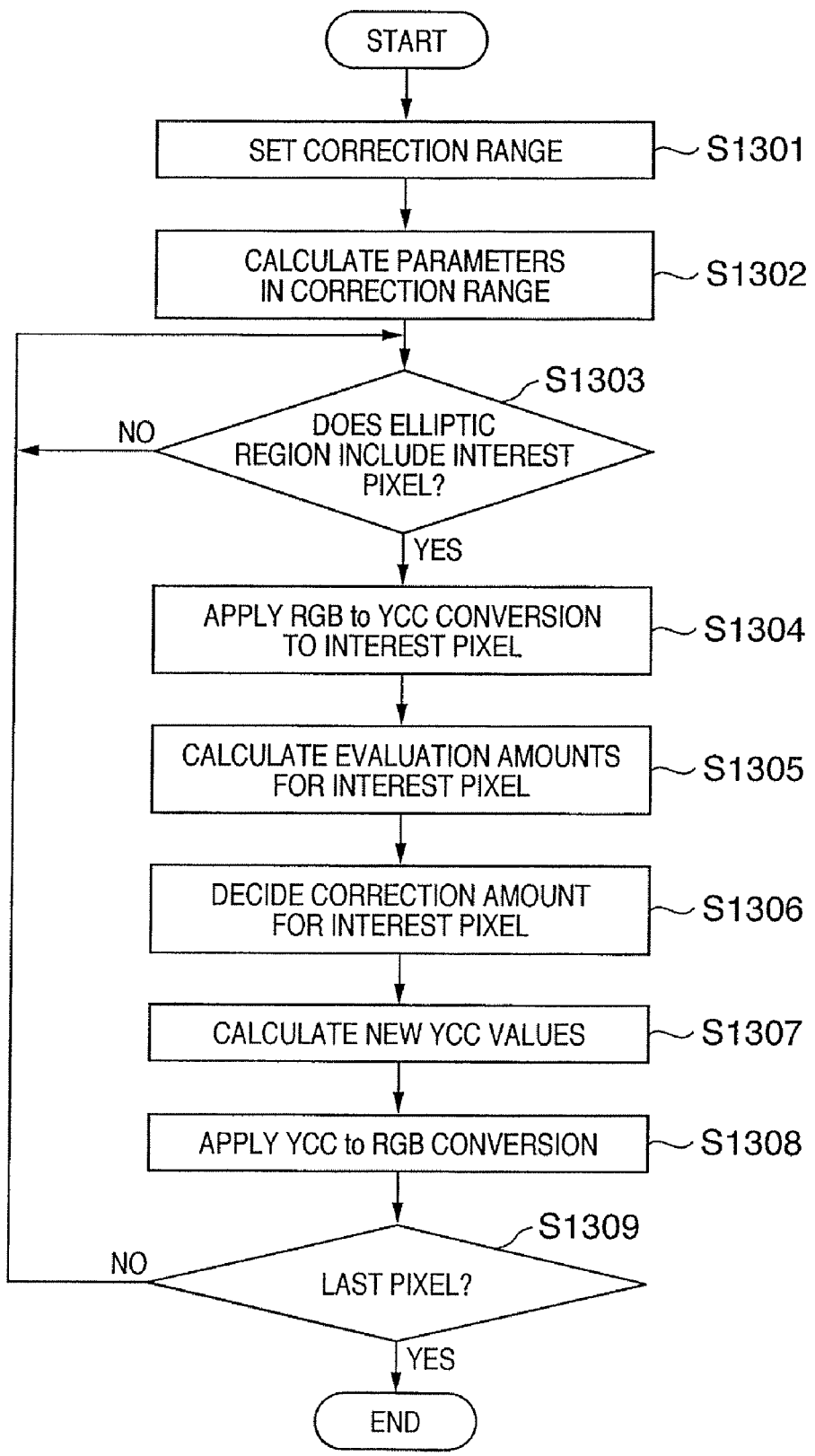
FIG. 15 is a flowchart showing correction processing for one of red-eye regions decided as correction ranges.

The correction unit 205 corrects the correction range (red-eye region) decided by the correction range decision unit 204. FIG. 15 is a flowchart showing the correction processing one of red-eye regions decided as the correction ranges. The correction unit 205 receives the list that describes one or more red-eye regions from the correction range decision unit 204, and applies correction processing to the red-eye regions one by one.

The CPU 101 decides a correction range for an interest red-eye region (S1301). FIG. 16 is a view for explaining the setting of the correction range. Referring to FIG. 16, a central rectangular region 1401 is the red-eye region described in the list. The CPU 101 sets, as a correction region, an elliptic region 1402 which has a major axis $L_{W1}$ and minor axis $L_{H1}$ that pass through the center (to be referred to as "origin" hereinafter) of the red-eye region 1401.

$$L_{W1} = L_{W0} \times CPARAM\_AREARATIO$$

$$L_{H1} = L_{H0} \times CPARAM\_AREARATIO \qquad (8)$$

where $L_{W0}$ and $L_{H0}$ are ½ the width and height of the red-eye region 1401, and CPARAM_AREARATIO is a parameter used to determine the correction range (for example, 1.2 to 1.5).

Next, the CPU 101 calculates a maximum luminance value Ymax and a maximum value Emax of the red evaluation amounts E in the elliptic region 1402 as parameters required to correct the interior of the elliptic region 1402 (S1302).

The CPU 101 then checks if an interest pixel exists within the elliptic region 1402 (S1303). Whether or not the interest pixel exists within the elliptic region 1402 is determined using the following inequality for calculating an ellipse:

$$(x/L_{W1})^2 + (y/L_{H1})^2 \leq 1 \qquad (9)$$

If the interest pixel located at the coordinate position (x, y) satisfies inequality (9), the interest pixel exists within the elliptic region 1402. The square roots in the left-hand side of inequality (9) correspond to the ratios of the distances from the origin to the interest pixel to those from the origin to the circumference. If the interest pixel does not exist within the elliptic region 1402, the CPU 101 selects the next interest pixel.

If the interest pixel exists within the elliptic region 1402, the CPU 101 converts the RGB values of the interest pixel to YCC values as luminance and color difference components (S1304). Various conversion methods are available, and any of such methods may be used.

The CPU 101 calculates respective evaluation amounts for the interest pixel (S1305). The evaluation amounts are parameters required to decide a correction amount, and are the following three values:

Rr: a ratio r/r0 of a distance r from the origin to the interest pixel to a distance r0 from the origin to the circumference of the ellipse;

Er: a ratio Er/Emax of the red evaluation amount E of the interest pixel to Emax; and Yr: a ratio Y/Ymax of a luminance value Y of the interest pixel to Ymax.

The CPU 101 calculates correction amounts Vy and Vc respectively for the luminance and color difference components of the interest pixel using the above parameters (S1306):

$$Vy = \{1 - Rr^{Ty1}\} \cdot \{1 - (1 - Er)^{Ty2}\} \cdot \{1 - Yr^{Ty3}\}$$

$$Vc\{1 - Rr^{Tc1}\} \cdot \{1 - (1 - Er)^{Tc2}\} \quad (10)$$

Both Vy and Vc assume values falling within the range from 0.0 to 1.0, and mean that the correction amounts are larger as they are closer to 1.0. Vy is decided using all the three parameters, and becomes smaller as the position of the interest pixel is separated farther away from the origin. When the red evaluation amount E of the interest pixel is smaller than Emax, Vy assumes a small value. When the luminance value Y of the interest pixel is close to Ymax, Vy assumes a small value. Setting a small correction amount of a high-luminance pixel provides an effect of preserving a highlight part (catch light) in the eye. On the other hand, Vc is decided by excluding the evaluation amount associated with luminance from the equation of Vy.

Figure 17:
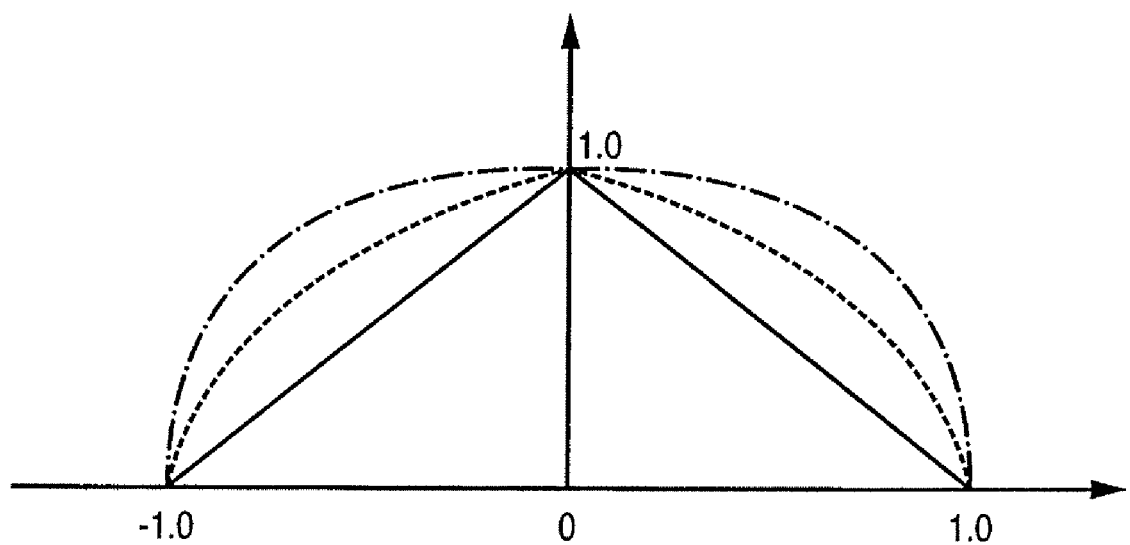
FIG. 17 is a view for explaining a method of setting correction parameters.

In equations (10), Ty1, Ty2, Ty3, Tc1, and Tc2 are also parameters. Therefore, by setting these parameters, respective evaluation amounts (i.e., those in braces in equations (10)) can be applied as primary (solid line), secondary (broken line), and ternary (one dashed chain line) straight lines or curves, as shown in FIG. 17.

The CPU 101 calculates YCC values after correction using the correction amounts Vy and Vc (S1307):

$$Y' = (1.0 - Wy \cdot Vy) \cdot Y$$

$$C' = (1.0 - Wc \cdot Vc) \cdot C \quad (11)$$

where Y and C are values before correction,

Y' and C' are values after correction, and

Wy and Wc are weights (0.0 to 1.0).

The weights Wy and Wc are adjusted when a correction strength is to be designated. For example, when three correction strength levels, i.e., weak, medium, and strong, are to be set, results with different correction strengths can be obtained by the same processing by setting both Wy and Wc to 0.3, 0.7, 1.0, or the like.

After new values of the luminance and color difference components are decided, the CPU 101 converts the YCC values into RGB values, and overwrites the RGB values on a buffer memory for an input image as pixel values after correction, or stores them at predetermined addresses on a buffer memory that stores an output image (S1308).

Until it is determined in step S1309 that the last pixel corresponding to the interest red-eye region is reached, the CPU 101 shifts the interest pixel in step S1303, and repeats the above processes (S1303 to S1308). If the last pixel corresponding to the interest red-eye region has been reached, the CPU 101 starts correction processing of the next red-eye region, thus repeating the correction processing for all red-eye regions recorded in the list.

Note that in the method described above, an image input to the correction unit 205 is made up of RGB components, and after the input image is converted into luminance and color difference components, which are corrected, the corrected luminance and color difference components are converted again to RGB components. However, the present invention is not limited to such specific method. For example, the RGB components may be converted into lightness and saturation components, and after these lightness and saturation components are corrected using the same method, the corrected lightness and saturation components may be converted into RGB components again, thus obtaining substantially the same result.

Furthermore, in the aforementioned example, the ratio Er of the red evaluation amount E of the interest pixel to the maximum amount Emax of the red evaluation amounts in the elliptic region 1402 is used as the parameter used to decide the correction amount. Alternatively, the parameter may be simply replaced by a saturation value. That is, the correction amount may be decided using the ratio of the saturation value of the interest pixel to the maximum saturation value in the elliptic region 1402.

As described above, since a plurality of origins of the region expansion for extracting red-eye pixels are set, and the region expansion is done in consideration of variations of evaluation amounts with the neighbor pixels, a red-eye region to be corrected can be decided with high precision. Since the red evaluation amount E is calculated from two, R and G components except for the B component in place of a saturation value of a general HSI system, a red-eye region can be decided with high precision without being influenced by a pale pigment color (or a light pigment) or dark pigment color (or a rich pigment).

Second Embodiment

Image processing according to the second embodiment of the present invention will be described below. Note that the same reference numerals in the second embodiment denote the same parts as in the first embodiment, and a detailed description thereof will be omitted.

The first embodiment has explained the method of specifying a correction range (red-eye region) by obtaining a plurality of origins based on the user designated position, and performing region expansion from these origins. The second embodiment will explain a method of specifying a correction range from a rectangular region designated by the user.

Figure 18:
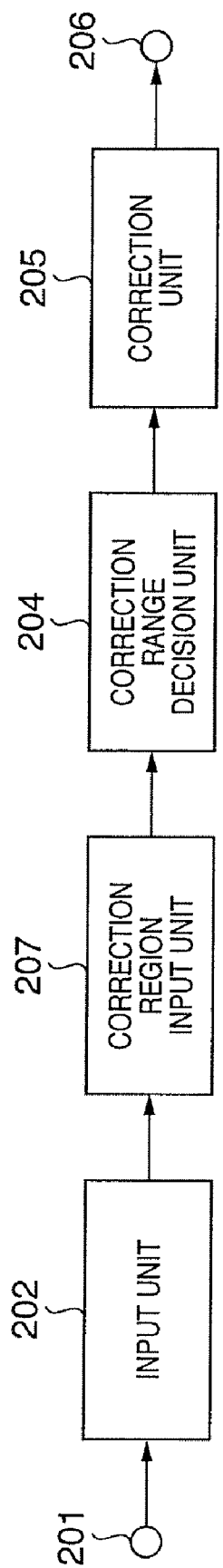
FIG. 18 is a functional block diagram showing an overview of correction processing of a red-eye image according to the second embodiment.

FIG. 18 is a functional block diagram showing an overview of processing for correcting a red-eye image according to the second embodiment. The CPU 101 executes this processing.

Figure 19:
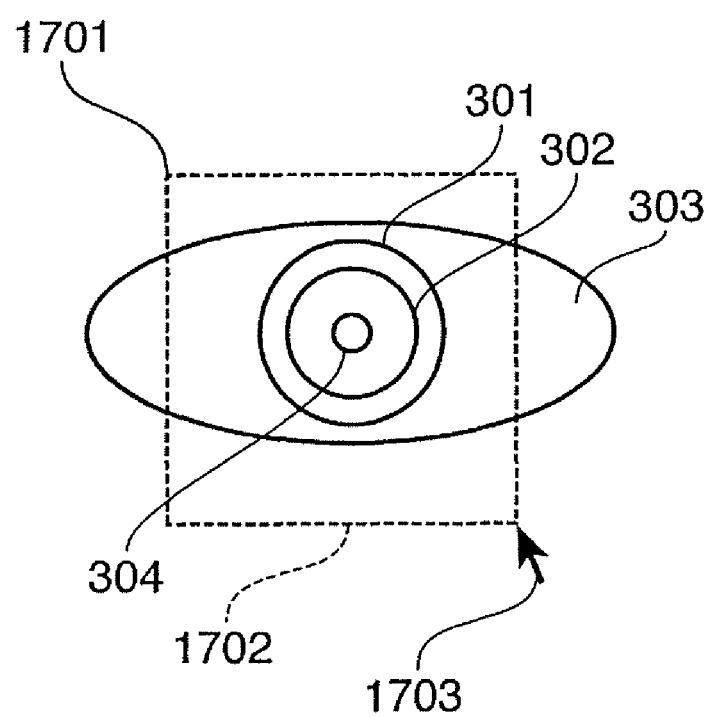
FIG. 19 is view showing a state in which the user designates a region where he or she wants to correct a red-eye image by moving a mouse pointer.

FIG. 19 shows a state in which the user designates a region 1702 where he or she wants to correct a red-eye image by moving a mouse pointer 1703. The user designates the region 1702 by moving the mouse pointer 1703 to one point (e.g., a point 1701) of the region, dragging the mouse pointer 1703 while holding down a mouse button, and then releasing the mouse button. Note that the region to be designated is not limited to a rectangle, but a circle, an ellipse, or a polygon (defined when, for example, the user traces the outer circumference of the region to be corrected) may be designated.

Figure 20:
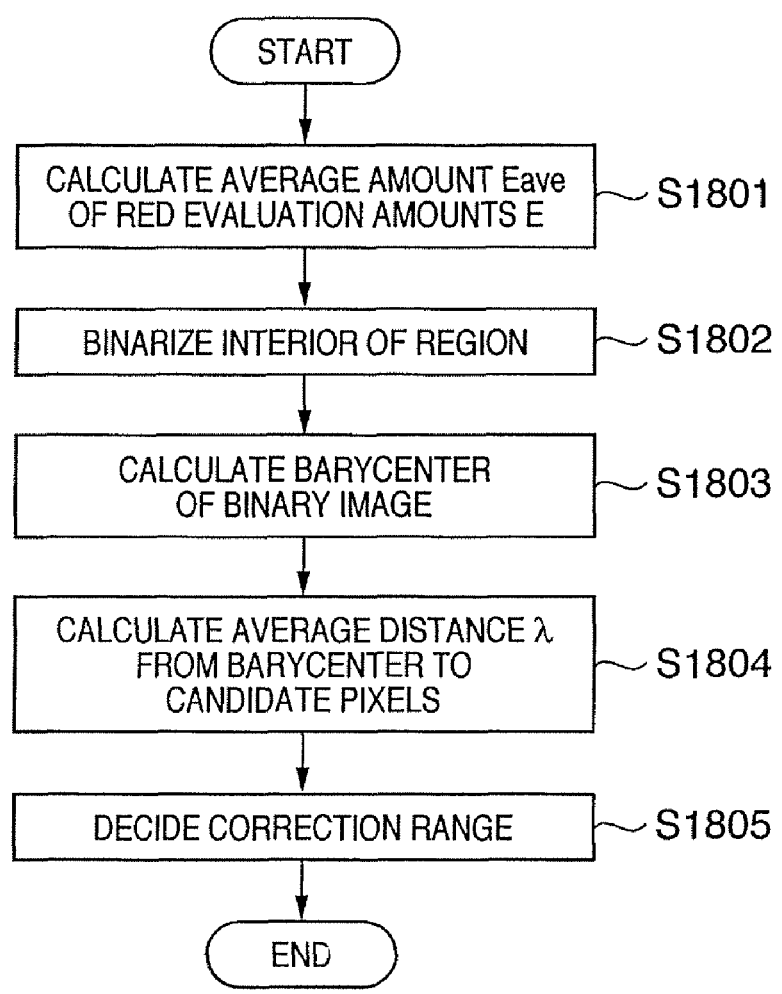
FIG. 20 is a flowchart showing the processing of a correction range decision unit.

FIG. 20 is a flowchart for explaining the processing of the correction range decision unit 204.

The CPU 101 calculates an average amount Eave of the red evaluation amounts E of pixels in the rectangular region 1702 (S1801), and binarizes the red evaluation amounts E of pixels in the rectangular region 1702 using the average amount Eave as a threshold (S1802). Note that the binarization threshold may use the average amount Eave intact, or may assume an amount obtained by adding or subtracting a certain margin to or from the average amount Eave.

Figure 21:
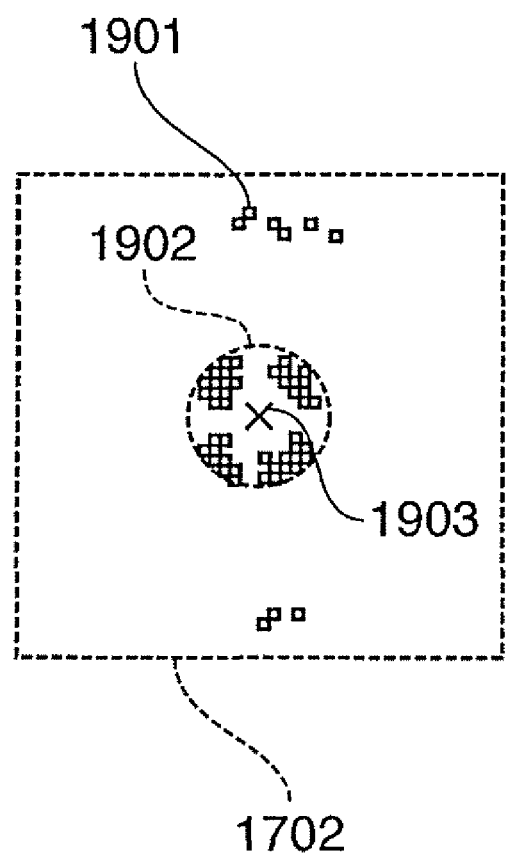
FIG. 21 shows an example of a binary image obtained by binarization.

FIG. 21 shows an example of a binary image obtained by binarization. Upon binarizing the rectangular region 1702, pixels which have red evaluation amounts E larger than the threshold (indicated by □ in FIG. 21; to be referred to as "candidate pixels" hereinafter) remain. The CPU 101 stores this binary image in the RAM 103 or the like.

The CPU 101 then calculates the barycenter of the binary image (S1803), and calculates an average distance λ of the candidate pixels from the barycenter (S1804). Then, the CPU 101 decides, as a correction range, a circular region 1902 shown in FIG. 21 which has the barycenter as the center and the average distance λ as a radius (S1805).

As shown in FIG. 21, in the binarization result using the average amount Eave of the red evaluation amounts, candidate pixels are not always concentrated in the pupil region 302, and candidate pixels 1901 may also exist in the flesh color region. All candidate pixels in the pupil region 302 are not always coupled, and the highlight region 304 in the pupil region 302 has a high possibility of being rejected from the candidate pixels. Therefore, by calculating the aforementioned average distance λ of the candidate pixels from the barycenter, the pupil region 302 can be specified with high precision.

As described above, when the user designates a region where he or she wants to correct a red-eye image, the correction range (red-eye region) can be decided with high precision.

Third Embodiment

Image processing according to the third embodiment of the present invention will be described below. Note that the same reference numerals in the second embodiment denote the same parts as in the first and second embodiments, and a detailed description thereof will be omitted.

The first embodiment specifies a red-eye region based on the user designated point, and the second embodiment specifies it based on the user designated region. However, these methods have both merits and demerits. For example, designation of one point of the first embodiment requires only a very simple operation since the user need only designate one point near a red-eye image. However, since a correction range is automatically set, a correction range that the user did not actually intend to set may be set. The region designation of the second embodiment can accurately designate a correction range that the user intended to set. However, the user must designate a region by mouse operations and the like, and such operations are troublesome for users who are unaccustomed to computers.

The third embodiment will explain a correction method that uses both designation of one point and region designation.

Figure 22:
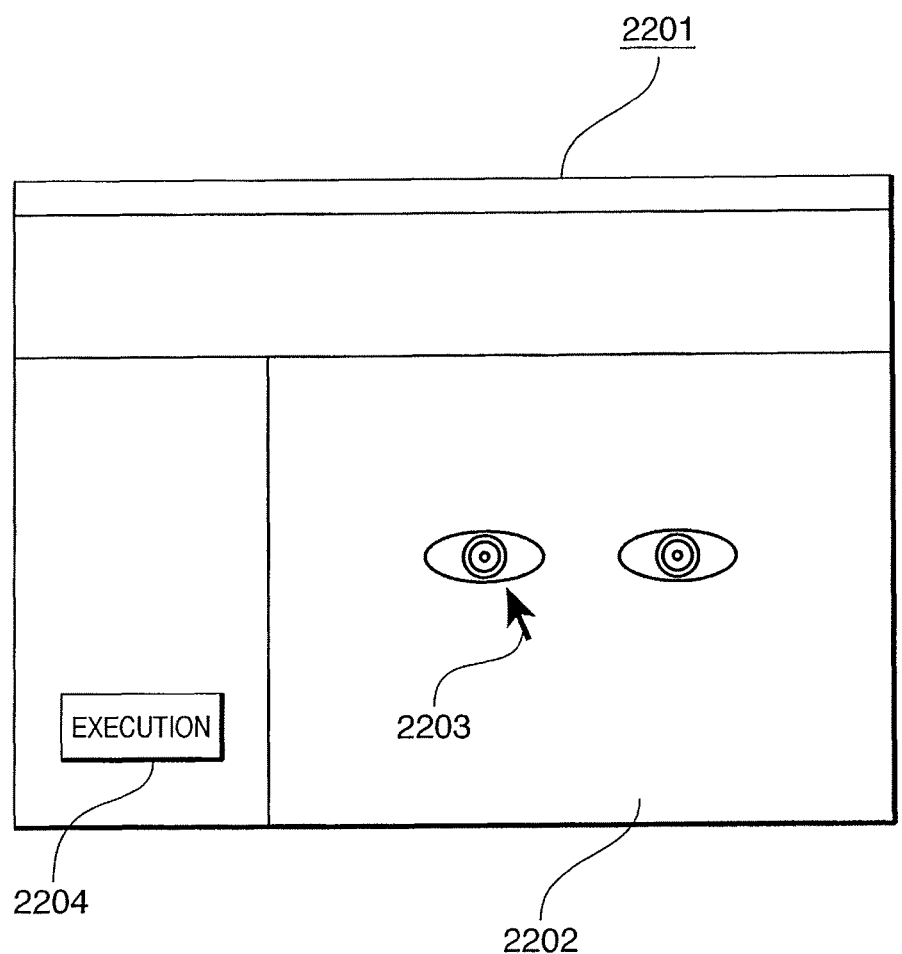
FIG. 22 shows an example of a user interface to be displayed on a monitor in the third embodiment.

FIG. 22 shows an example of a user interface 2201 displayed on the monitor 113 in the third embodiment. A window 2202 is used to designate a correction region by the user, and displays an image to be corrected. The user designates a desired correction region by operating a mouse pointer 2203, and presses an "execution" button 2204 upon completion of designation of the correction region, thus instructing to start execution of correction processing. The user can select one point designation or region designation upon designating the correction region.

Figure 23:
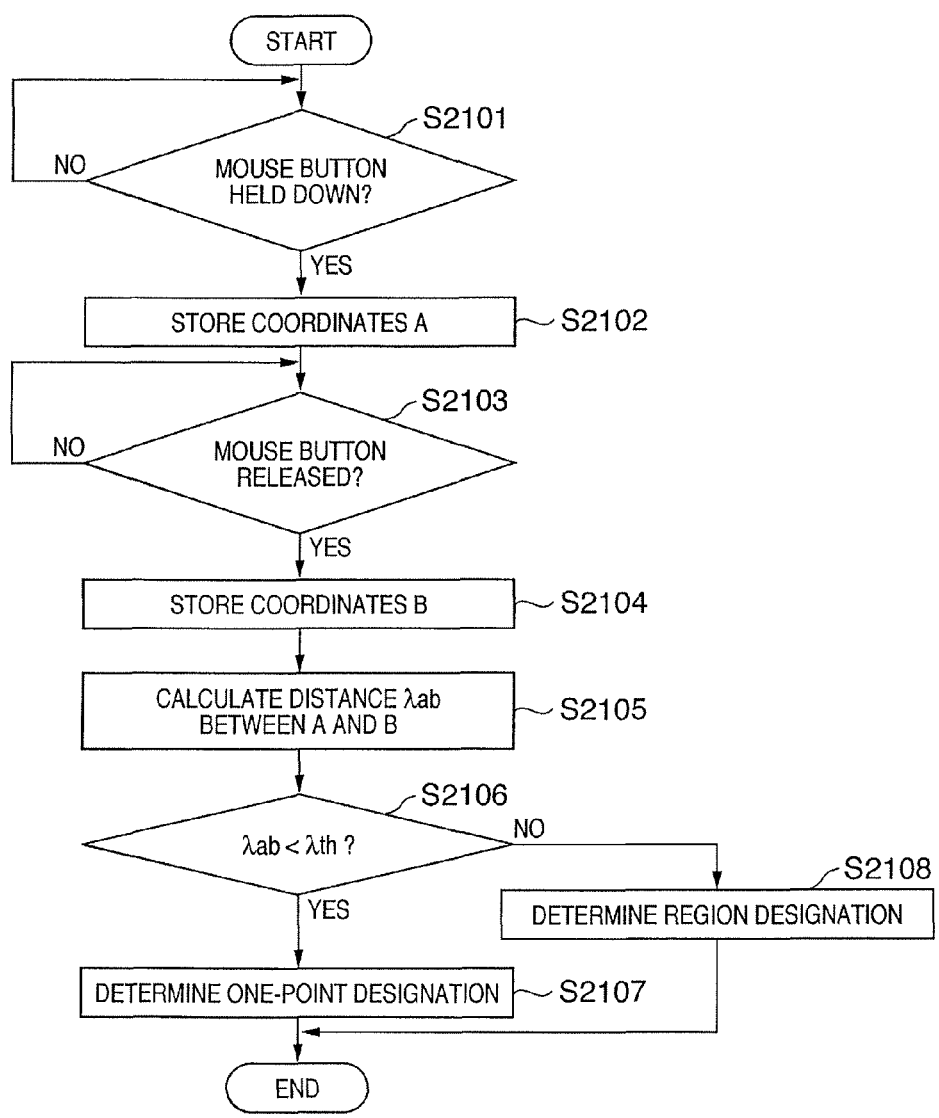
FIG. 23 is a flowchart showing processing for determining whether the user designates one point or a region.

FIG. 23 is a flowchart showing processing for determining if the user designates one point or a region. The CPU 101 executes this processing.

The CPU 101 checks if the mouse pointer 2203 is located on the window 2202 and the user holds down the mouse button (S2101). If the mouse pointer 2203 is located on the window 2202 and the user holds down the mouse button, the CPU 101 stores coordinates A of the mouse pointer 2203 at that time in the RAM 103 (S2102). The CPU 101 then checks if the user releases the mouse button (S2103). If the user releases the mouse button, the CPU 101 stores coordinates B of the mouse pointer 2203 at that time in the RAM 103 (S2104). Note that when the mouse pointer 2203 moves outside the window 2202 during the processes of steps S2101 to S2103, the CPU 101 clears the coordinates stored in the RAM 103, and the process returns to step S2101.

The CPU 101 calculates a distance λab between coordinates A and B stored in the RAM 103 (S2105) and compares the distance λab with a predetermined distance λth (S2106). If λab<λth, the CPU 101 determines that the user designates one point (S2107); if λab≧λth, the CPU 101 determines that the user designates a region (S2108).

The reason why the CPU 101 compares the distance λab between A and B with the predetermined distance λth will be explained below. Position detection of an optical sensor adopted in recent mice has high sensitivity, and a position can be detected with very high precision. By contrast, such mouse may detect minute hand vibrations, and may move the pointer by a small distance. That is, even when the user designates one point, the pointer moves slightly between clicks of the mouse button, and the CPU 101 may erroneously determine region designation. Hence, the distance λab and predetermined distance λth are compared and if the moving distance is small (less than λth), the CPU 101 determines one point designation.

As the predetermined distance λth, a value which has the number of pixels as a unit may be set on a coordinate system having the upper left corner of the monitor as an origin. For example, on a monitor which has a display resolution of 1600×1200 dots, λth=5 is set. In this case, if coordinates A are (100, 100), and coordinates B are (103, 103), since $λab = \sqrt{(3^2 + 3^2)} = 4.2$, the CPU 101 determines one point designation.

However, if λth is fixed by the number of pixels, the operational feeling differs depending on the resolution of the monitor. For example, on a monitor of 3200×2400 dots, five pixels correspond to a small distance of about 0.1% in the horizontal direction. On the other hand, on a monitor of 600×480 dots, five pixels are about 0.8% in the horizontal direction, and do not mean a small distance. In consideration of such display resolution differences, λth should be set as a ratio to the display resolution. For example, if λth is set to be 0.5% of the number of dots in the horizontal direction, it corresponds to 16 pixels for 3200 dots, and three pixels for 600 dots. In this manner, when λth is set in association with the display resolution, the user can experience an operational feeling which is not influenced by the monitor resolution.

Fourth Embodiment

Image processing according to the fourth embodiment of the present invention will be described below. Note that the same reference numerals in the fourth embodiment denote the same parts as in the first to third embodiments, and a detailed description thereof will be omitted.

As a red-eye correction function, a technique that combines an automatic detection and correction function and manual correction (assume that the manual correction includes semiautomatic correction in the following description) has been proposed. Various red-eye automatic detection methods have been proposed. If any of these methods is adopted, it is difficult to attain a 100% detection ratio, and a region which is not corrected or correction other than a red-eye region occurs. Hence, the manual correction is used together to compensate for the automatic detection and correction function, and a red-eye region which cannot be automatically detected can be corrected.

In such combined use of the automatic detection and correction function, and manual correction, it is effective to change a correction method, correction strength, and the like in accordance with the automatic and manual modes. For example, correction of a golden eye image is known.

Figure 24:
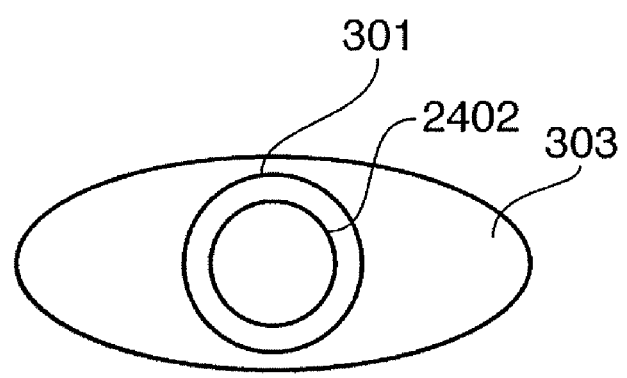
FIG. 24 is a view for explaining a golden eye image.

A golden eye effect is a phenomenon that a pupil region gleams gold in place of red. In most of golden eye images, catch light due to photographic flash light, which exists in the red-eye effect, does not exist. Upon applying the correction for lowering the luminance and color difference components described in the first embodiment to a golden eye image, the luminance level of the pupil region (a region 2402 shown in FIG. 24) tends to be originally high, and a sufficient correction result cannot be obtained unless the luminance lowering amount is larger than that for a red-eye image. If the correction amount is increased, a region outside the pupil region becomes extremely dark, and a satisfactory result cannot often be obtained. Since no catch light exists, a very unnatural correction result is obtained.

Figure 25:
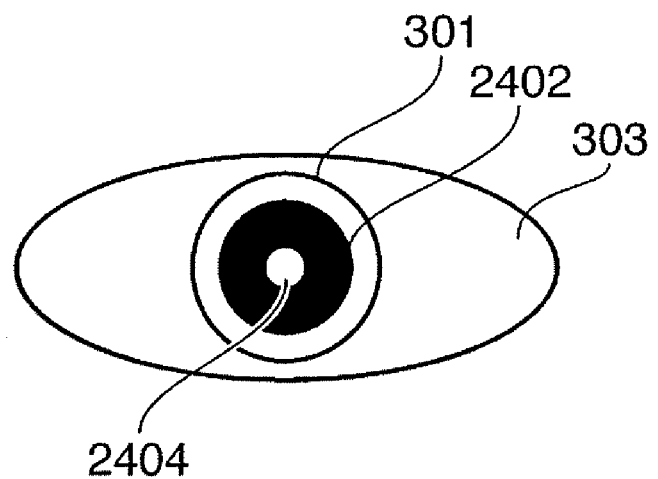
FIG. 25 is a view for explaining correction of a golden eye region.

Therefore, an effective correction method for a golden eye image is as follows. As shown in FIG. 25, the interior of the detected pupil region 2402 is filled with a predetermined pupil color (e.g., black), and a white region 2404 as catch light is added to the center of the pupil region 2402. In other words, effective correction of a golden eye image is to discard original image data and to generate image data of the pupil region 2402.

However, if such correction is applied as automatic correction, detection errors stand out. As described above, using any of the automatic detection, a desired region cannot be extracted 100%. For example, lips, a flaring candle, an ear lobe, or the like may be extracted as a golden eye region. It is readily understood that when the above correction is applied to the erroneously detected region, corrected portions painted in, e.g., black stand out compared to the correction for lowering the luminance and color difference components described in the first embodiment.

Hence, in the red-eye image correction function which has both the automatic detection and correction function and the manual correction function, extreme correction like that of a golden eye image is limited to manual correction. With the manual correction, since the user designates a desired region (or position), a region other than an eye is never corrected.

Figure 26:
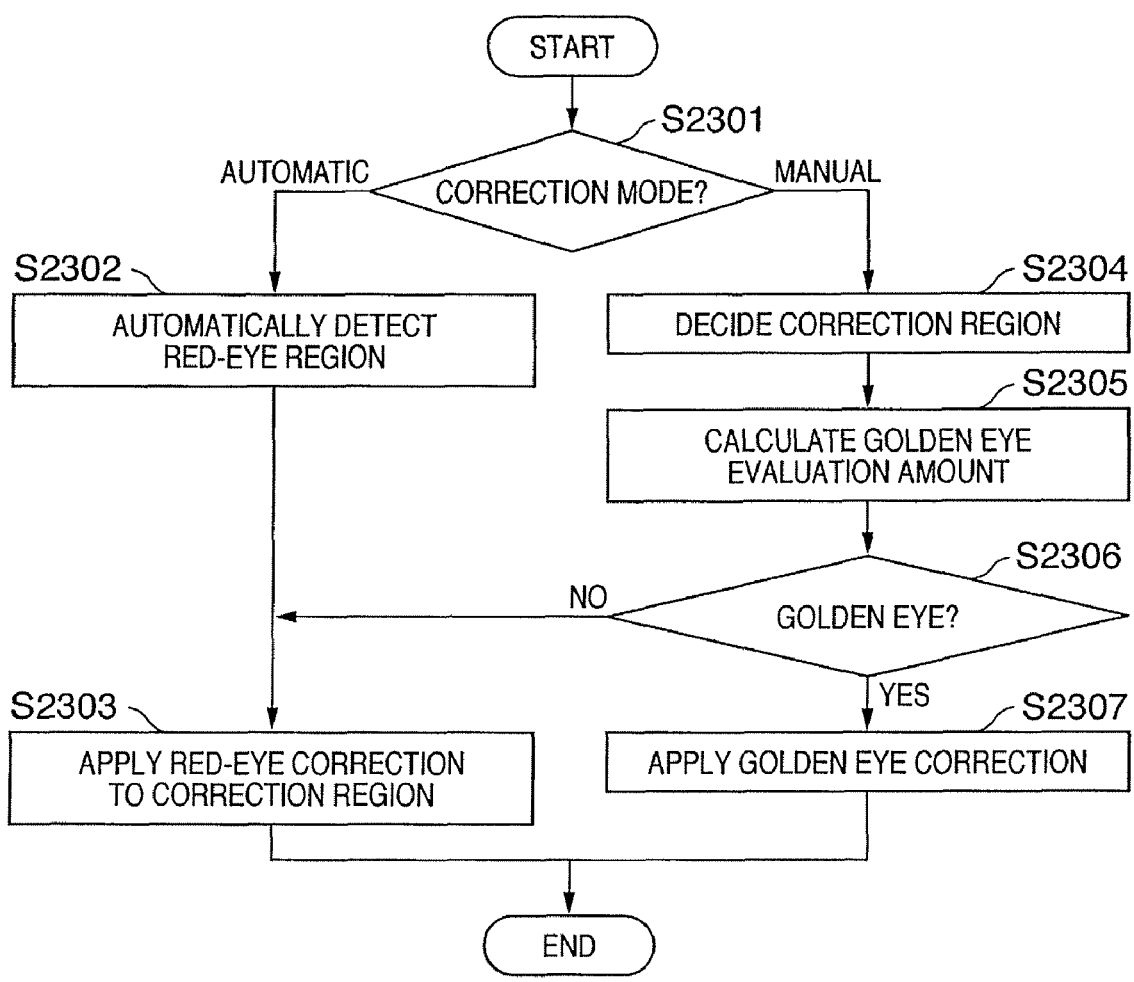
FIG. 26 is a flowchart showing the processing of the fourth embodiment.

FIG. 26 is a flowchart showing the processing of the fourth embodiment. The CPU 101 executes this processing.

The CPU 101 checks if the current correction mode is an automatic or manual mode (S2301). If the current correction mode is an automatic correction mode, the CPU 101 performs automatic detection of a red-eye region (S2302), and corrects a red-eye image using the method described in the first embodiment for a correction region (S2303). As for the red-eye region automatic detection method, various methods such as those described in the paragraphs of the prior arts, and the like have been proposed. Any of these methods may be used.

On the other hand, if it is determined that the current correction mode is a manual correction mode, the CPU 101 decides a correction region based on user's designation (S2304). The correction region can be decided using the method described in the above embodiments. The CPU 101 then calculates evaluation amounts used to determine if the correction region is a red-eye region or golden eye region (S2305). Since the golden eye image is brighter than the red-eye image, and suffers less luminance change in the pupil region as its property, the average luminance value in the correction region and the standard deviation (or variance value) of luminance values are used as the evaluation amounts.

The CPU 101 compares the calculated evaluation amounts with predetermined thresholds to see whether or not the correction region is a golden eye region (S2306). If the average luminance value is larger than a predetermined threshold and the standard deviation of luminance values is smaller than a predetermined threshold, the CPU 101 determines that the correction region is a golden eye region.

If it is determined that the correction region is a golden eye region, the CPU 101 performs the aforementioned correction of a golden eye image (S2307); otherwise, the CPU 101 corrects a red-eye image using the method described in the first embodiment for the correction region (S2303).

Note that the evaluation amounts of a golden eye region are not limited to the average luminance value and standard deviation of luminance values. For example, the average value and standard deviation of R component values may be used in place of the luminance values.

Modification of Embodiments

In each of the above embodiments, the red evaluation amount E which does not use any B of RGB component values is defined as a color evaluation amount for each pixel. However, the present invention is not limited to such specific value. For example, a red evaluation amount E may be defined by:

$$E=(i \cdot R+j \cdot G+k \cdot B)/R \quad (12)$$

where coefficients i, j, and k are weights which can assume negative values and the coefficient k may be set to be zero or a value smaller than the coefficients i and j, thus obtaining the same effects.

Alternatively, after a pixel value is converted into another color space such as Lab, YCbCr, or the like, a red evaluation amount E may be defined regardless of a blue component or by setting a small weight of the blue component.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-322646, filed Nov. 7, 2005, which is hereby incorporated by reference herein in its entirety.

What is claimed is:

1. A method of detecting a correction region of an image, comprising:

using a processor to perform the steps of:

inputting point information indicating a point which is designated by a user in the image;

setting a plurality of origin pixels corresponding to start points of region expansion in a region including one eye, the region having a predetermined size which includes the point indicated by the point information;

executing the region expansion from each of the plurality of origin pixels in the region including one eye; and deciding on an area, which includes a plurality of regions expanded from each of the plurality of origin pixels as an image region to be corrected, wherein said setting step sets at least two pixels as the plurality of origin pixels, the two pixels including a first pixel corresponding to the point indicated by the point information, and a second pixel selected on the basis of its predetermined evaluation amount in the region having the predetermined size, wherein the executing of region expansion occurs by calculating a difference $Vj$ between the evaluation amounts $E$ of the first pixel or the second pixel and four contiguous neighbor pixels, calculating a difference $Vk$ between the evaluation amounts $E$ of a contiguous neighbor pixel and surrounding pixels surrounding the contiguous neighbor pixel, denoting $R1=|Vj-Vk|$, and determining that region expansion occurs from each origin pixel as long as $R1<T1$, where $T1$ is a predetermined threshold.

2. The method according to claim 1, wherein in the setting step, a third pixel having a top color evaluation amount in the region having the predetermined size, and a fourth pixel and a fifth pixel corresponding to two remaining vertices of a rectangle which has the first pixel and the third pixel as diagonal vertices are set as the plurality of origin pixels instead of the second pixels.

3. The method according to claim 1, wherein the region expansion step comprises the steps of:

calculating, using one of the plurality of origin pixels as a reference pixel at the beginning of the region expansion, a color evaluation amount of the reference pixel, color evaluation amounts of neighbor pixels which respectively neighbor the reference pixel, and color evaluation amounts of surrounding pixels which respectively neighbor each neighbor pixel on a line in which the reference pixel and the neighbor pixel line up;

calculating a first difference between the color evaluation amount of the reference pixel and the color evaluation amount of each neighbor pixel;

calculating a second difference between the color evaluation amount of each neighbor pixel and the color evaluation amount of the corresponding surrounding pixel;

determining based on the first and second differences whether or not each neighbor pixel is to be added to an expanded region; and recursively repeating the first to third calculation steps and the determination step to have the pixel added to the expanded region, to which the determining step determines whether to add each neighbor pixel, as the reference pixel.

4. The method according to claim 3, wherein the determination step includes a step of determining, when the first difference is less than a first threshold, and a difference between the first difference and the second difference is less than a second threshold, that the neighbor pixel is to be added to the expanded region subjected to the determining operation by the determining step that determines whether or not each neighbor pixel is to be added to the expanded region.

5. The method according to claim 3, wherein the first calculation step calculates the color evaluation amount based on R and G components and not based on a B component of a pixel.

6. The method according to claim 3, wherein the first calculation step assigns a weight, which is smaller than weights assigned to R and G components, to a B component when the color evaluation amount is calculated from the R, G and B components of a pixel.

7. The method according to claim 1, further comprising the step of applying correction processing for correcting poor color tone to the correction region.

8. The method according to claim 7, wherein the poor color tone is a red-eye effect.

9. An image processing apparatus for detecting a correction region of an image, comprising:

an input section, arranged to input point information indicating a point which is designated by a user in the image;

a setting section, arranged to set a plurality of origin pixels corresponding to start points of region expansion in a region including one eye, the region having a predetermined size which includes the point indicated by the point information;

an expander, arranged to execute the region expansion from each of the plurality of origin pixels in the region including one eye; and a decider, arranged to decide on an area, which includes a plurality of regions expanded from each of the plurality of origin pixels, as an image region to be corrected, wherein said setting section sets at least two pixels as the plurality of origin pixels, the two pixels including a first pixel corresponding to the point indicated by the point information, and a second pixel selected on the basis of its predetermined evaluation amount in the region having the predetermined size, wherein the executing of region expansion occurs by calculating a difference Vj between the evaluation amounts E of the first pixel or the second pixel and four contiguous neighbor pixels, calculating a difference Vk between the evaluation amounts E of a contiguous neighbor pixel and surrounding pixels surrounding the contiguous neighbor pixel, denoting R1=|Vj−Vk|, and determining that region expansion occurs from each origin pixel as long as R1<T1, where T1 is a predetermined threshold.

10. A computer-readable storage medium storing a computer executable-program for causing a computer to perform a method of detecting a correction region that exhibits poor color tone of an eye image, the method comprising the steps of:

inputting point information indicating a point which is designated by a user in the image;

setting a plurality of origin pixels corresponding to start points of region expansion in a region including one eye, the region having a predetermined size which includes the point indicated by the point information;

executing the region expansion from each of the plurality of origin pixels in the region including one eye; and deciding on an area, which includes a plurality of regions expanded from each of the plurality of origin pixels, as an image region to be corrected, wherein said setting step sets at least two pixels as the plurality of origin pixels, the two pixels including a first pixel corresponding to the point indicated by the point information, and a second pixel selected on the basis of its predetermined evaluation amount in the region having the predetermined size, wherein the executing of region expansion occurs by calculating a difference Vj between the evaluation amounts E of the first pixel or the second pixel and four contiguous neighbor pixels, calculating a difference Vk between the evaluation amounts E of a contiguous neighbor pixel and surrounding pixels surrounding the contiguous neighbor pixel, denoting R1=|Vj−Vk|, and determining that region expansion occurs from each origin pixel as long as R1<T1, where T1 is a predetermined threshold.

11. The method according to claim 1, wherein the color evaluation amounts are respectively calculated from R and G components of each pixel in the image region to be corrected.

12. The method according to claim 1, wherein using R and G components of each pixel in the image region to be corrected, the color evaluation amounts are respectively calculated by an equation (R−G)/R.

\* \* \* \* \*